United States Patent
LaFreniere et al.

(10) Patent No.: US 9,154,956 B2
(45) Date of Patent: *Oct. 6, 2015

(54) SYSTEM AND METHOD FOR MANAGING INDIVIDUAL USE OF A MOBILE TELECOMMUNICATIONS ACCOUNT

(71) Applicant: CenturyLink Intellectual Property LLC, Denver, CO (US)

(72) Inventors: Gary W. LaFreniere, Olathe, KS (US); Kelsyn D. S. Rooks, Overland Park, KS (US); David E. Emerson, Overland Park, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/140,877

(22) Filed: Dec. 26, 2013

(65) Prior Publication Data
US 2014/0106716 A1    Apr. 17, 2014

Related U.S. Application Data

(63) Continuation of application No. 12/625,990, filed on Nov. 25, 2009, now Pat. No. 8,644,795.

(51) Int. Cl.
| | |
|---|---|
| *H04M 3/00* | (2006.01) |
| *H04M 11/00* | (2006.01) |
| *H04W 12/08* | (2009.01) |
| *H04M 3/38* | (2006.01) |
| *H04M 3/42* | (2006.01) |
| *H04M 15/00* | (2006.01) |
| *H04M 17/00* | (2006.01) |
| *H04W 8/18* | (2009.01) |

(52) U.S. Cl.
CPC .............. *H04W 12/08* (2013.01); *H04M 3/382* (2013.01); *H04M 3/42272* (2013.01); *H04M 15/00* (2013.01); *H04M 15/70* (2013.01); *H04M 15/765* (2013.01); *H04M 15/7652* (2013.01); *H04M 15/88* (2013.01); *H04M 15/888* (2013.01); *H04M 17/00* (2013.01); *H04W 8/18* (2013.01); *H04M 2203/6009* (2013.01); *H04M 2242/14* (2013.01)

(58) Field of Classification Search
CPC .......... H04W 4/24; H04W 4/26; H04W 8/245
USPC ......................................... 455/405, 419, 420
See application file for complete search history.

(56) References Cited

U.S. PATENT DOCUMENTS

| | | | |
|---|---|---|---|
| 5,950,138 A * | 9/1999 | Norimatsu .................... 455/551 |
| 8,644,795 B2 | 2/2014 | LaFreniere et al. |
| 2004/0162876 A1 | 8/2004 | Kohavi |
| 2004/0267971 A1* | 12/2004 | Seshadri .......................... 710/8 |

(Continued)

OTHER PUBLICATIONS

U.S. Appl. No. 12/625,964; Examiner's Answer dated Apr. 25, 2013; 6 pages.

(Continued)

*Primary Examiner* — Omoniyi Obayanju
(74) *Attorney, Agent, or Firm* — Swanson & Bratschun, L.L.C.

(57) ABSTRACT

Disclosed are a system and method for managing access to a mobile telecommunication account by disabling use of a mobile device associated with a mobile telecommunication account or sub account when the mobile network detects that a restriction contained in a restriction database is violated.

20 Claims, 7 Drawing Sheets

(56) References Cited

U.S. PATENT DOCUMENTS

| | | | |
|---|---|---|---|
| 2008/0070609 | A1 | 3/2008 | Ackley |
| 2008/0114862 | A1 | 5/2008 | Moghaddam et al. |
| 2009/0099919 | A1* | 4/2009 | Schultheiss et al. ............ 705/14 |
| 2010/0268589 | A1* | 10/2010 | Wesby ....................... 705/14.25 |
| 2011/0124314 | A1 | 5/2011 | LaFreniere et al. |
| 2011/0124315 | A1 | 5/2011 | LaFreniere et al. |

OTHER PUBLICATIONS

U.S. Appl. No. 12/625,964; Final Rejection dated Jul. 30, 2012; 23 pages.

U.S. Appl. No. 12/625,964; Final Rejection dated Nov. 13, 2012; 16 pages.

U.S. Appl. No. 12/625,964; Issue Notification dated Jan. 15, 2014; 1 page.

U.S. Appl. No. 12/625,964; Non Final Office Action dated Dec. 28, 2011; 11 pages.

U.S. Appl. No. 12/625,964; Notice of Panel Decision dated Feb. 22, 2013; 2 pages.

U.S. Appl. No. 12/625,990; Final Rejection dated May 18, 2012; 13 pages.

U.S. Appl. No. 12/625,990; Final Rejection dated Jun. 18, 2013; 18 pages.

U.S. Appl. No. 12/625,990; Non Final Office Action dated Dec. 6, 2011; 7 pages.

U.S. Appl. No. 12/625,990; Non Final Office Action dated Feb. 28, 2013; 20 pages.

U.S. Appl. No. 12/625,990; Notice of Allowance dated Sep. 30, 2013; 19 pages.

* cited by examiner

SYSTEM AND METHOD FOR MANAGING INDIVIDUAL USE OF A MOBILE TELECOMMUNICATIONS ACCOUNT

CROSS REFERENCE TO RELATED APPLICATION

This application is a continuation of U.S. patent application Ser. No. 12/625,990, filed Nov. 25, 2009 by Gary W. LaFreniere et al. and entitled, "System and Method for Managing Individual Use of a Mobile Telecommunications Account", which is hereby incorporated by reference in its entirety.

TECHNICAL FIELD

The claims and disclosure relate to the technical field of managing mobile telecommunications accounts.

BACKGROUND

Many mobile telecommunication accounts have plan use limits. For example, a plan may provide a set number minutes-of-use during an account period, e.g., a month. Exceeding such limits may result in additional surcharges that may increase costs above the base plan rate for a given months. Other examples of plan limits include, but are not limited to, number of text-messages sent and/or received, data transfer and internet access. In addition, some mobile telecommunication accounts are shared between a number of users with plan limits applied on an aggregate basis such that excessive use by one shared user can result in another shared users use to exceed plan limits.

SUMMARY

Disclosed herein is a system and method that enables a mobile device to be configured with a particular telephone number upon entry of a code into the device. In one embodiment, the disclosed system and method permits the sharing of a single physical mobile device with multiple individuals who each receive and send telephone calls to and from their individual telephone numbers. In another embodiment, the disclosed system and method permits the use of a fleet of devices configurable to specific telephone numbers as needed. For example, a business could share a number of devices among multiple employees based on particular needs or circumstances, wherein the devices are configured and reconfigurable to a particular telephone number and/or user as desired. In another embodiment, this system and method enables multiple individuals to use a single mobile device while each keeping personalized device settings. In yet another embodiment, this system and method permits use of a single plan or shared plan to manage the call time, data usage or text usage allocated to subaccounts and disable particular devices from additional usage, for example, to ensure that the shared plan does not go over plan limits. In still another embodiment, this system and method permits restrictions on the GPS location a mobile device can be used in.

DETAILED DESCRIPTION OF THE DRAWINGS

Figure 1:
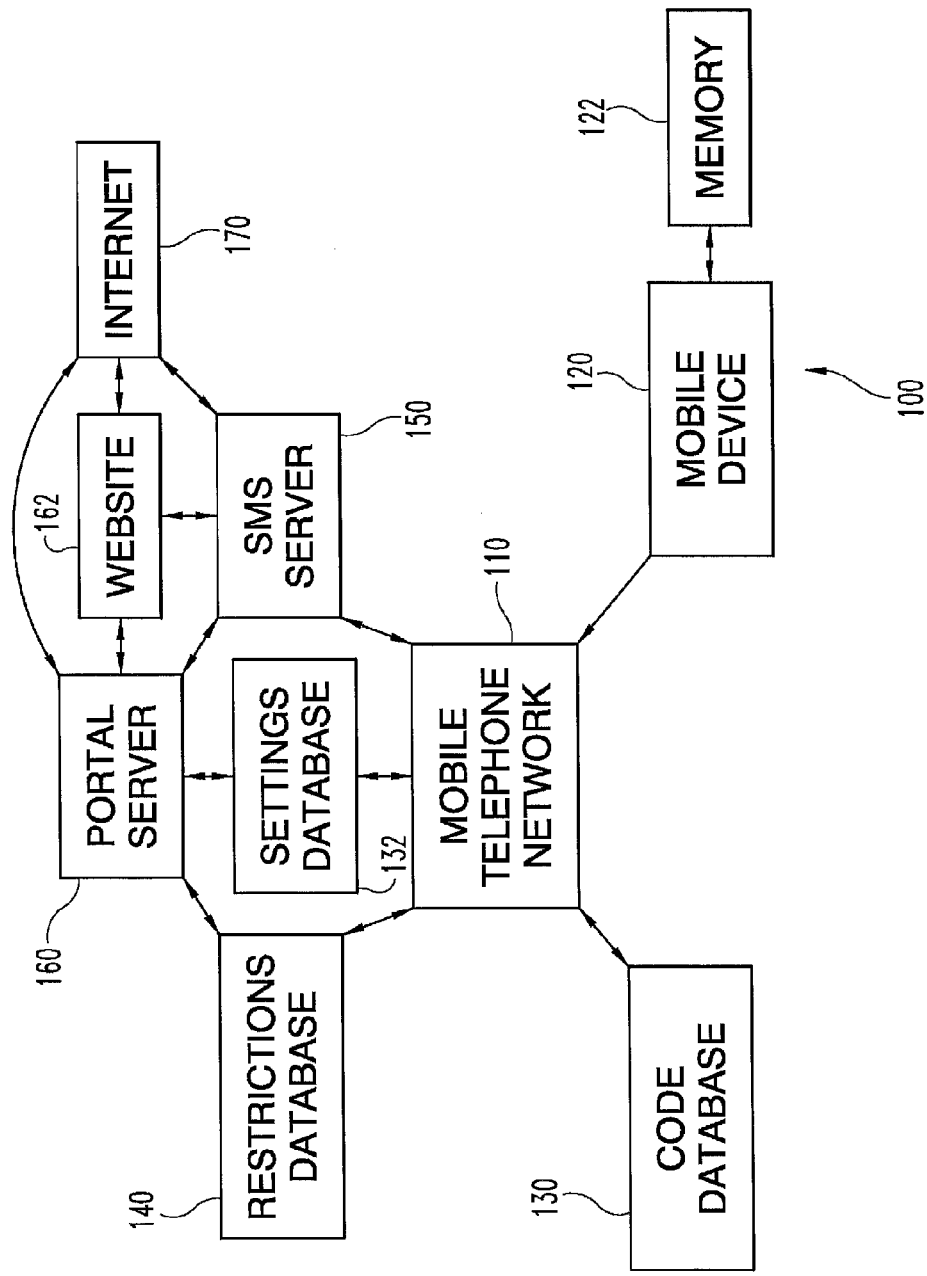
FIG. 1 illustrates a system diagram of a mobile telephone network.

Reference is now made to certain embodiments thereof and specific language used to describe the same. It should nevertheless be understood that no limitation of the scope of this disclosure and the claims are thereby intended, such alterations, further modifications and further applications of the principles described herein being contemplated as would normally occur to one skilled in the art to which the disclosure relates. In several figures, where there are the same or similar elements, those elements are designated with the same or similar reference numerals.

Disclosed herein is a system and method that enables a mobile device to be configured with a particular telephone number upon entry of a code into the mobile device. In one embodiment, the disclosed system and method permits the sharing of a single physical mobile device with multiple individuals who each receive and send telephone calls to and from their individual telephone numbers. In another embodiment, the disclosed system and method permits the use of a fleet of mobile devices configurable to specific telephone numbers as needed. For example, a business could have a number of telephones or mobile devices that are shared among multiple employees based on particular needs or circumstances, wherein the telephones or mobile devices are configured and reconfigurable to a particular telephone number as needed. In another embodiment, this system and method enables multiple individuals to use a single mobile telephone while each keeping personalized telephone settings. In yet another embodiment, this system and method permits use of a single plan or shared plan to manage the number of minutes allocated to subaccounts and disable particular telephones from additional usage to ensure that the shared plan does not go over plan limits.

Referring now to FIG. 1, communication system 100 is illustrated. Communication system 100 includes mobile telephone network 110, mobile device 120, code database 130, settings database 132, restrictions database 140, SMS server 150, portal server 160, website 162 and internet 170. Mobile device 120 can be a mobile telephone, a computer, a Personal Digital Assistant (PDA) or any other type of mobile telecommunication device desired. Mobile device 120 may optionally include memory 122. In one embodiment, memory 122 can be wholly or partly in the form of a removable Subscriber Identity Module (SIM) card. In another embodiment, memory 122 can be in the form of a micro-SD (Secure Digital) slot and a removable micro-SD memory card. For example, in one embodiment an individual could use a SIM card, micro-SD memory card or other form of removable memory to transfer photographs 408 or any other customized setting 400 (see FIG. 4) between various local telephones.

Mobile telephone network 110 communicates with mobile device 120 via any desired communication protocol. The particular configuration of mobile telephone network 110 may vary between carriers and by the technology used to communicate with mobile device 120. The communication link between mobile telephone network 110 and mobile device 120 may include voice communications, data communications, text-message, short message service (SMS), data transfer, settings information and restrictions information.

Mobile telephone network 110 is operably connected to code database 130, settings database 132, restrictions database 140, SMS server 150 and portal server 160. Code database 130 includes a plurality of telephone numbers individually associated with a plurality of codes. Settings database 132 includes mobile telephone settings linked to the list of telephone numbers that may be the same list of telephone numbers in code database 130. Restrictions database 140 may include instructions for the operation of mobile telephone network 110 (restrictions) associated with a list of telephone numbers that may be the list of telephone numbers in code database 130. Portal server 160 may be operable to permit a user to access SMS server 150 and settings database 132 via internet 170 to permit the user to manage any missed text-messages, voice mails, their contacts list, call history, etc., when they are not provisioned on mobile device 120.

Portal server 160 may be operable to provide on-line access via internet 170 to permit users to check minutes-of-usage remaining for a particular period. Portal server 160 can also provide information as to users currently provisioned on a mobile device and those users and/or telephone numbers that are not currently available for telephonic communications. In one embodiment, portal server 160 can also have the alternative landline number associated with users. In yet another embodiment, portal server 160 can report a user's current telephone number including mobile device 120 if currently provisioned to that user's personal mobile telephone, or landline telephone number if the user is not currently provisioned on a mobile device.

Settings database 132, restrictions database 140 and SMS server 150 are operatively connected to portal server 160. Portal server 160 is operably connected to internet 170 and website 162. These operative connections through portal server 160 to internet 170 permit authorized users to access and/or modify the contents of settings database 132, restrictions database 140 and SMS server 150 via an internet connection (including via mobile device 120).

Figure 2:
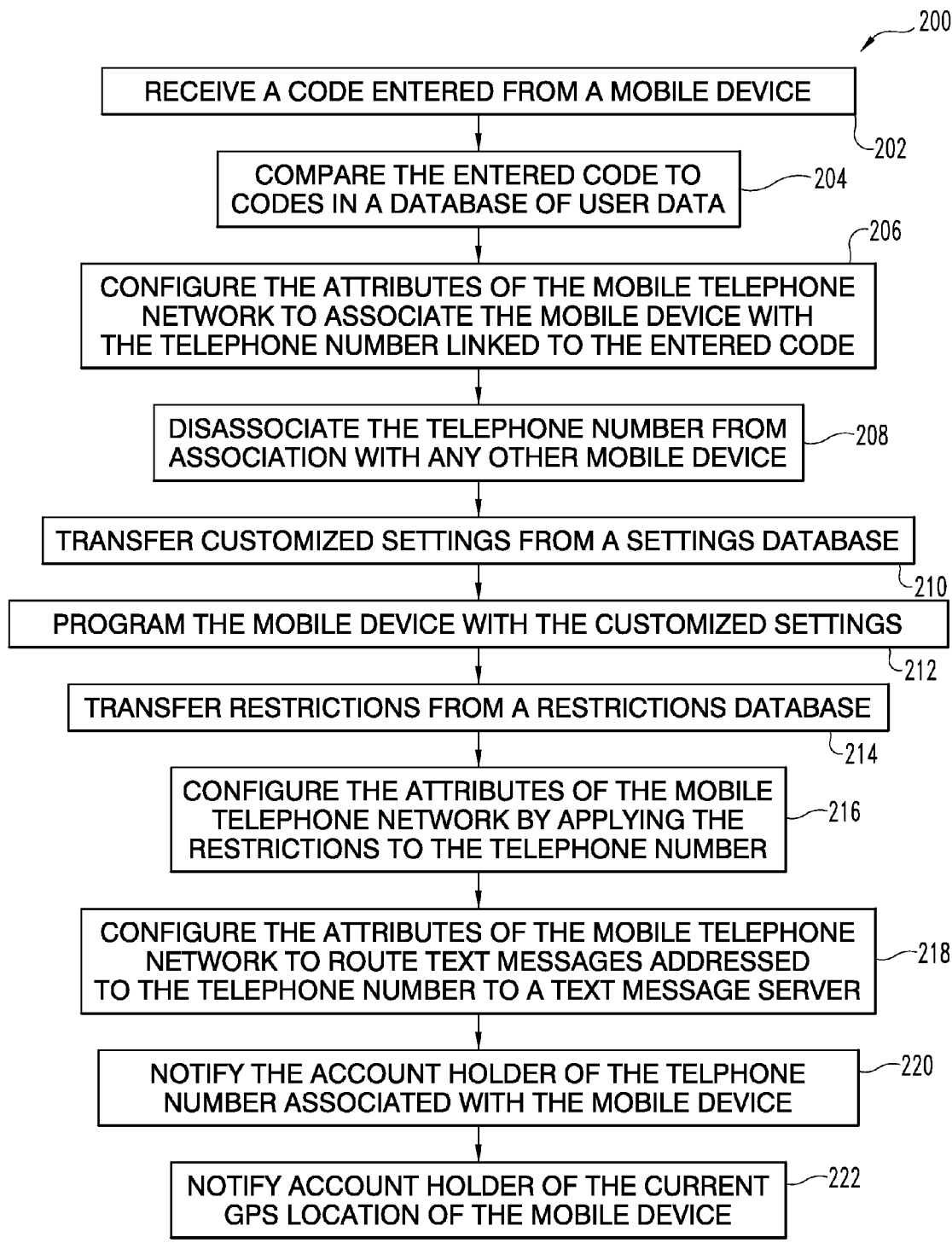
FIG. 2 illustrates a procedure for configuring a mobile telephone network to associate a mobile device with one of the plurality of telephone numbers.

Referring now to FIG. 2, procedure 200 is illustrated. Procedure 200 includes acts for configuring a mobile telephone network to associate a mobile device with one of a plurality of telephone numbers. Procedure 200 begins with act 202 where mobile telephone network 110 receives a code inputted into mobile device 120 and transferred to mobile telephone network 110. As described above, this data transfer utilizes any appropriate data transfer technique or method for mobile device 120 to communicate with mobile telephone network 110. Procedure 200 continues with act 204 where mobile telephone network 110 accesses code database 130 and compares the entered code to the codes in the code database 130 to validate the entered code. In act 206, mobile telephone network 110 configures the attributes of mobile device 120 to associate mobile device 120 with the telephone number in code database 130 linked to the entered code. In one embodiment, act 206 may include associating the mobile station I.D. (MSID) with the serial number for the mobile device.

The MSID is a number that is associated with the home service provider and the telephone number. The end user MSID, model of mobile device 120 and other key attributes for provisioning mobile device 120 are stored in mobile device 120 and/or memory 122 and/or mobile telephone network 110 and are associated to a master MSID.

In one embodiment, when a user turns on mobile device 120, software on mobile device 120 requests entry of the code for use. The client would then input the code and mobile device 120 would then access mobile telephone network 110 to complete acts 204 and 206.

Procedure 200 continues with act 208 where mobile telephone network 110 disassociates the telephone number associated with mobile device 120 in act 206 from association with any other mobile device. Procedure 200 continues with act 210 where customized settings are transferred from settings database 132 and/or from memory 122 to mobile device 120. As detailed below with regard to FIG. 4, the custom settings transferred can include, but are not limited to, contacts, call history, downloads, photographs, internet favorites, sound settings, display settings, call settings, calendar, blue tooth settings, minutes of use, text usage and data usage. In act 212, mobile device 120 is programmed with the customized settings transferred to mobile device 120 in act 210. Act 212 results in either the creation of new settings in mobile device 120 or in overriding or reprogramming comparable customized settings from a previous association in mobile device 120.

Procedure 200 continues with act 214, where restrictions from restrictions database 140 are transferred to mobile device 120 via mobile telephone network 110. As described below with regard to FIG. 5, restrictions can include but are not limited to minutes-of-use, GPS location, number of text-messages, data use, time-of-day, restrictions and/or day-of-week restrictions. In act 214, the attributes of mobile telephone network 110 are configured by applying the transferred restrictions to mobile device 120. For example, in the case of minutes-of-use restriction, in the event mobile telephone network 110 detects that the telephone number associated with mobile device 120 has exceeded its minutes-of-use for a given time period then mobile device 120 (and the telephone number associated with it) can be blocked from sending or receiving additional calls during the given time period.

Procedure 200 continues with act 218 where mobile telephone network 110 is configured to route text-messages (SMS messages) addressed to the telephone number associated with mobile device 120 to SMS server 150. This routing can be in lieu of or in addition to any routing elsewhere, including routing directly to mobile device 120. In one embodiment, all text-messages routed to any telephone number in code database 130 are routed to SMS server 150 regardless of the association of any particular number with a particular telephone or device. In one embodiment, SMS server 150 may forward text-messages of particular users to an e-mail address. Such forwarding can be in lieu or in addition to storing the text-message on SMS server 150.

Procedure 200 continues with act 220 where notification of the status of mobile device 120 and the telephone number currently associated with mobile device 120 is sent to an account holder. Notification may optionally include GPS information reflecting the current approximate GPS location of mobile device 120. Procedure 200 concludes with act 222 where the account holder is notified of the current GPS location of mobile device 120. Act 222 can be repeated as often as desired to permit the location of the mobile device to be tracked by the account holder.

Figure 3:
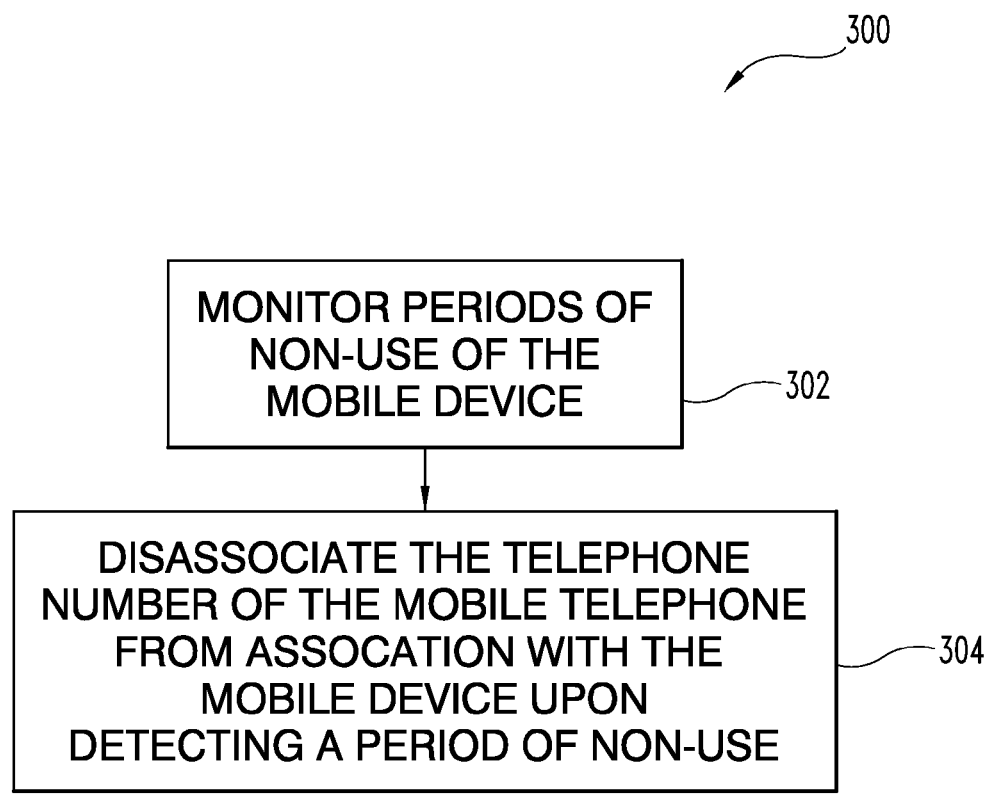
FIG. 3 illustrates a procedure for disassociating a telephone number from association with a mobile device due to a period of nonuse.

Referring now to FIG. 3, procedure 300 is illustrated. Procedure 300 monitors nonuse of mobile device 120 and disassociates mobile device 120 from association with the telephone number upon detecting a period of nonuse. Procedure 300 includes act 302 where mobile telephone network 110 monitors the use and keeps track of periods of nonuse of mobile device 120. Procedure 300 concludes with act 304 where mobile telephone network 110 disassociates mobile device 120 from association with the current telephone number when mobile telephone network 110 detects sufficient period of nonuse. The actual period of nonuse required can be varied and customized as needed. For example, the period of nonuse required for disassociation could be eight hours.

Figure 4:
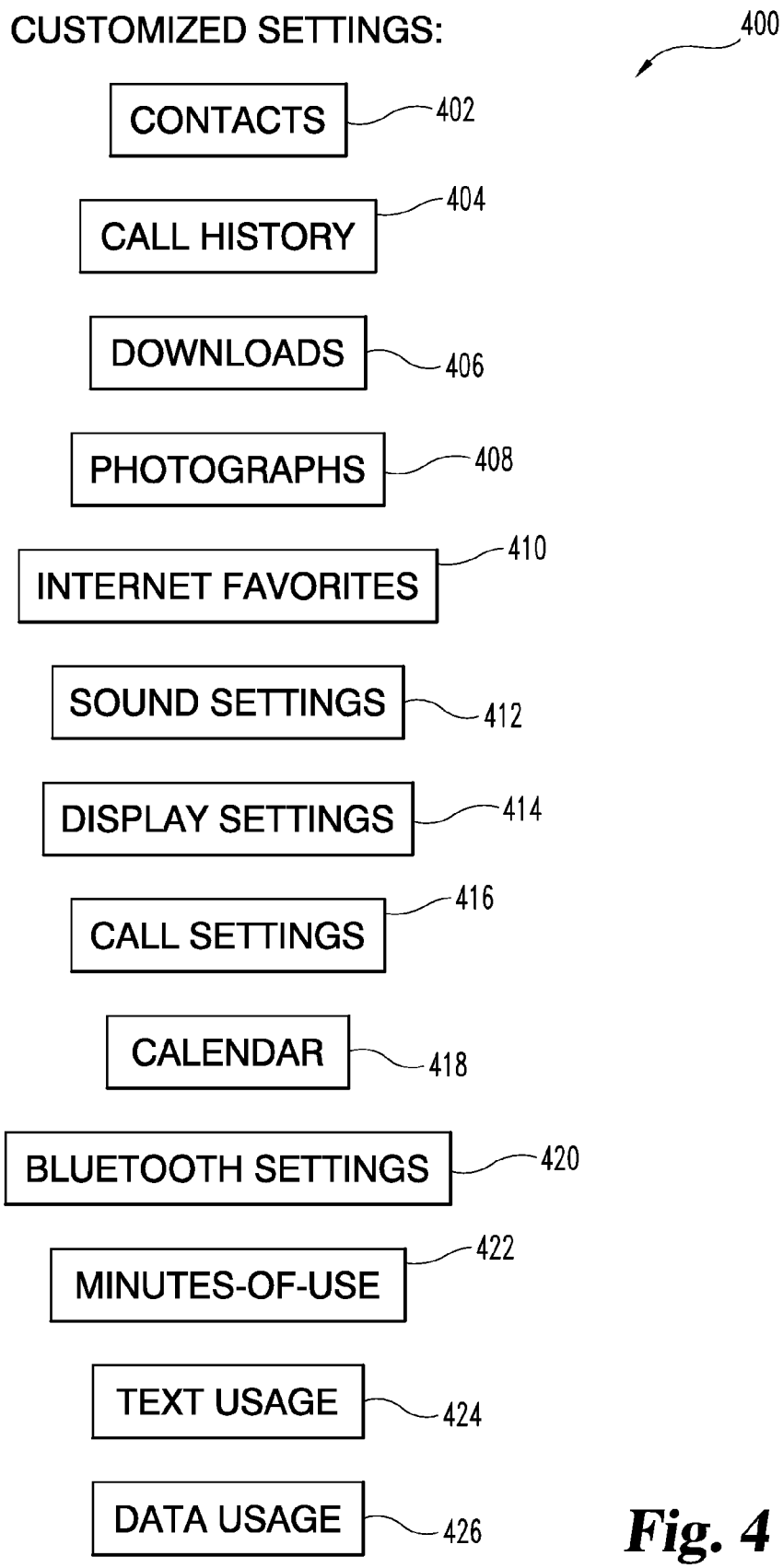
FIG. 4 illustrates a list of optional customized settings that can be downloaded from a settings database.

Referring now to FIG. 4, customized settings 400 are illustrated. Customized settings 400 include some of the customized settings that can be programmed into mobile device 120 after validation of an entered code. As described above, customized settings 400 can be stored in memory 122 or in settings database 132 and transferred and programmed into mobile device 120. In some embodiments, the association between customized settings 400 and a particular phone number in settings database 132 may permit users to load customized settings 400 onto new devices as old devices are upgraded (or replaced if lost). Similarly, settings database 132 may permit a recovery of customized settings 400 in the event a device is reset to factory default settings.

Customized settings 400 may include contacts 402, call history 404, downloads 406, photographs 408, internet favorites 410, sound settings 412, display settings 414, call settings 416, calendar 418, Bluetooth settings 420, minutes-of-use 422, text usage 424 and data usage 426. Contacts 402 can include lists of names and telephone numbers and possibly e-mail and instant message addresses. Call history 404 can include a history of sent and received calls. Downloads 406 can include custom applications for mobile device 120. Photographs 408 can include personal photographs stored in mobile device 120 or memory 122 and background screen displays. Internet favorites 410 may include bookmarked internet sites. Sound settings 412 can include ring tones and ring tone associations with contacts 402. Display settings 414 may include a background image brightness contrast settings. Call settings 416 can include answer options and automatic retry options. Display settings 414 may include banner, backlight, wallpaper, display themes, fonts and clock format. Sound settings 412 can include volume, call sounds in association with various contacts 402, alert sounds, key pad volume, ear piece volume and alarm sounds. Call settings 416 may include TTY mode, one-touch speed dial settings, voice privacy and ringer settings. Calendar 418 may include appointments and reminders. Bluetooth settings 420 can include Bluetooth device associations. Minutes-of-use 422 may include the number of remaining minutes-of-use for a given period. Text usage 424 can include a number of text-messages remaining for a given period for either sent and/or received text-messages. Data usage 426 may include internet connection time limits and/or limitations on the amount of data transfer permitted.

Figure 5:
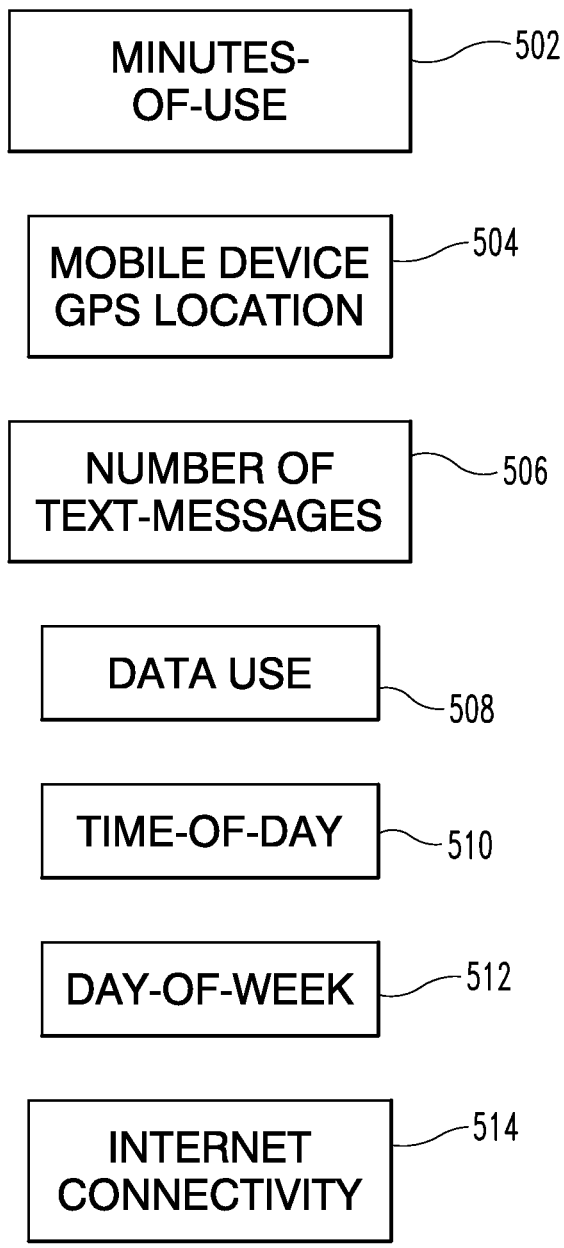
FIG. 5 illustrates a list of optional restrictions that can be downloaded from a restrictions database.

Referring to FIG. 5, mobile telephone restrictions 500 are illustrated. Mobile device restrictions 500 are stored in restrictions database 140 and are applied to the use of mobile device 120 and/or the associated telephone number on mobile telephone network 110. Mobile device restrictions 500 includes minutes-of-use 502, mobile device GPS location 504, number of text-messages 506, data use 508, time-of-day 510, day-of-week 512 and internet connectivity 514. Minutes-of-use 502 may include the number of minutes of telephone usage remaining for a given period. For example, minutes-of-use remaining during a month billing cycle. Mobile device GPS location 504 can include either GPS locations of permitted use or GPS locations of excluded use. The number of text-messages 506 is the number of text-messages allowed for a particular billing cycle. Data use 508 is the number of minutes of internet access and/or download data transfer limitations for a particular billing cycle. Time-of-day 510 may include a list of times in which access to mobile telephone network 110 by mobile device 120 is permitted or a list of times in which access is prohibited. Day-of-week 512 is a listing of days of allowed access or days of prohibited access to mobile telephone network 110 by mobile device 120 (or the associated telephone number). Internet connectivity 514 is the time of internet connectivity allowed for a particular billing cycle.

Authorized users can access restrictions database 140 via portal server 160 and/or internet 170 to manage individual mobile device usage and calling restrictions for community mobile telephone users. Restrictions database 140 and mobile device restrictions 500 can be enforced and modified in a near real time manner by the account holder accessing restrictions database 140 in a real time manner on-line. When changes to restrictions database 140 are made by an authorized user, mobile telephone network 110 is operable to update restrictions applied to mobile device 120 with the changes made to restrictions database 140.

Figure 6:
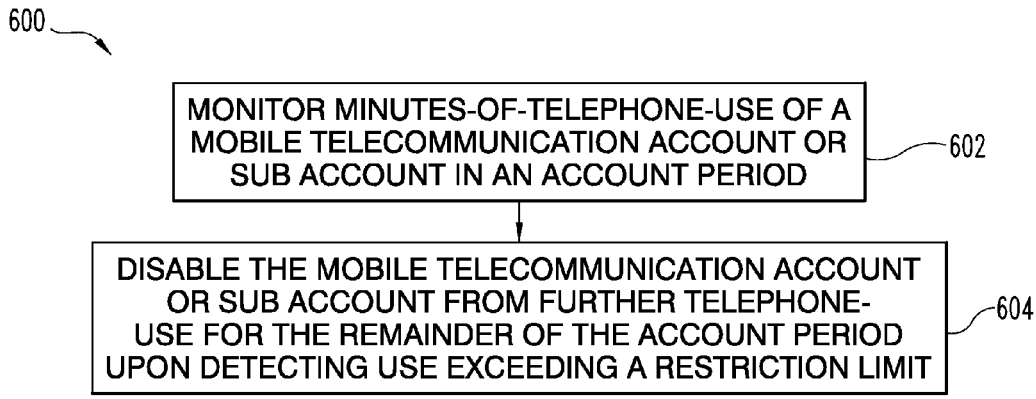
FIG. 6 illustrates a method of restricting minutes-of-use.

Referring to FIG. 6, an embodiment of minutes-of-use restriction 502 is illustrated as method 600. Method 600 includes monitoring the minutes of use of a mobile telecommunication account or subaccount during an account period, e.g., a monthly subscription period (602). Method 600 disables the mobile telecommunication account or subaccount from further telephone use for the remainder of a particular account period when mobile telephone network 100 detects use exceeding the minutes-of-use of restriction 502. For example, if a shared plan has attributed to it 150 minutes of use during a monthly subscription period and the mobile telephone network 110 detects use for that period exceeding 150 minutes then mobile telephone network 110 would prohibit further calls to or from the mobile device associated with the particular shared plan from sending and/or receiving further calls (604). (Emergency use exceptions can be provided, for example, permitting calls to emergency numbers such as 911 regardless of any current restriction).

Figure 7:
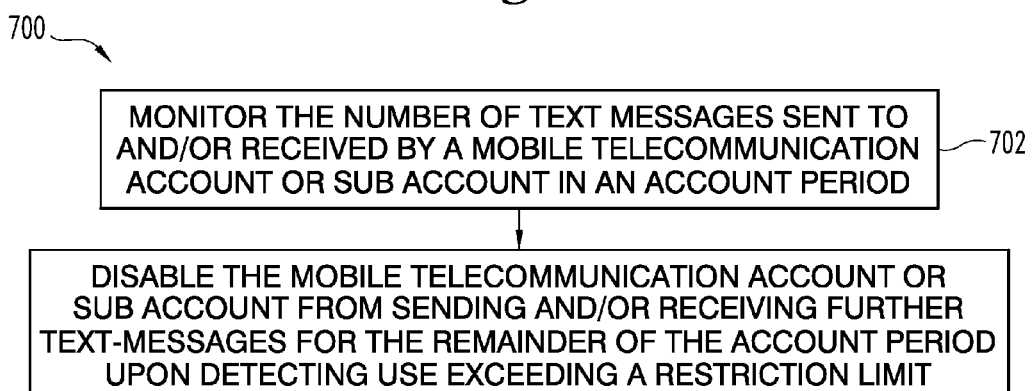
FIG. 7 illustrates a method of restricting the number of text-messages.

Referring to FIG. 7, an embodiment of number of text-messages restriction 506 is illustrated as method 700. Method 700 begins with mobile telephone network 110 monitoring the number of text-messages sent to and/or received by a mobile telecommunication account or subaccount during a particular account period (702). Method 700 continues by disabling the particular mobile telecommunication account or subaccount from sending and/or receiving additional text-messages for the remainder of the particular account period when mobile telephone network 110 detects use exceeding number of text-messages restriction 506. For example, number of text-message restriction 506 could limit the number of sent text-messages, in which case mobile telephone network 110 would monitor the number of text-messages sent and when number of text-message restriction 506 is reached for a particular plan period, then further text-messages would no longer be sent from the particular telecommunication account for the remainder of the particular plan period. In another embodiment, method 700 could entail monitoring both sent and received messages in which case mobile telephone network 110 would monitor and aggregate sent and received messages until the number of text-messages restriction 506 is met, at which point mobile telephone network would cease sending and forwarding text-messages to or from the particular telecommunication account or subaccount (704). Of course, exceptions could apply, for example, to text-messages sent as part of a mass broadcast message.

Figure 8:
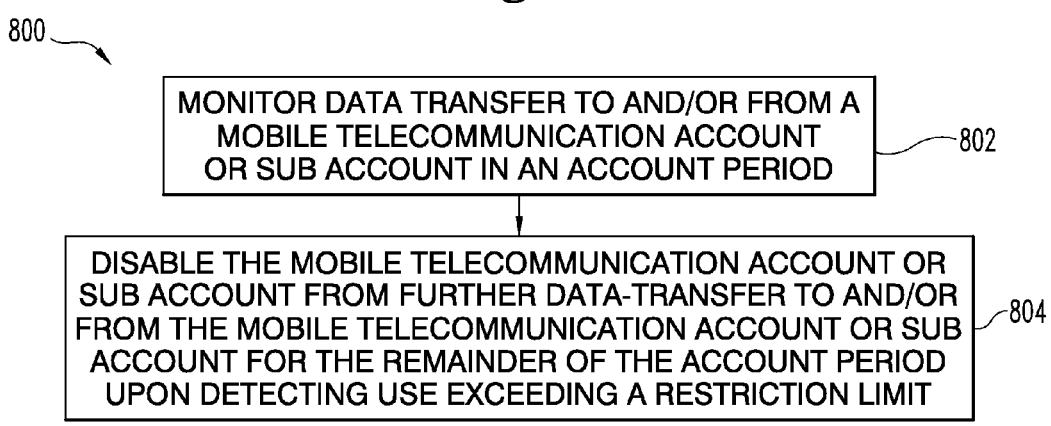
FIG. 8 illustrates a method of restricting data transfer.

Referring to FIG. 8, an embodiment of data use restriction 108 is illustrated as method 800. Method 800 begins by monitoring data transfer to and/or from mobile devices associated with a particular mobile telecommunication account or subaccount during a particular account period (802). By non-limiting example, data transfer can be measured by volume, e.g., Megabytes, or by time of data transfer. Method 800 continues by disabling the mobile telecommunication account or subaccount from accessing further data transfer to and/or from mobile devices associated with the mobile telecommunication account or subaccount for the remainder of the account period when mobile telephone network 110 detects use exceeding data use restriction 508 (804).

Figure 9:
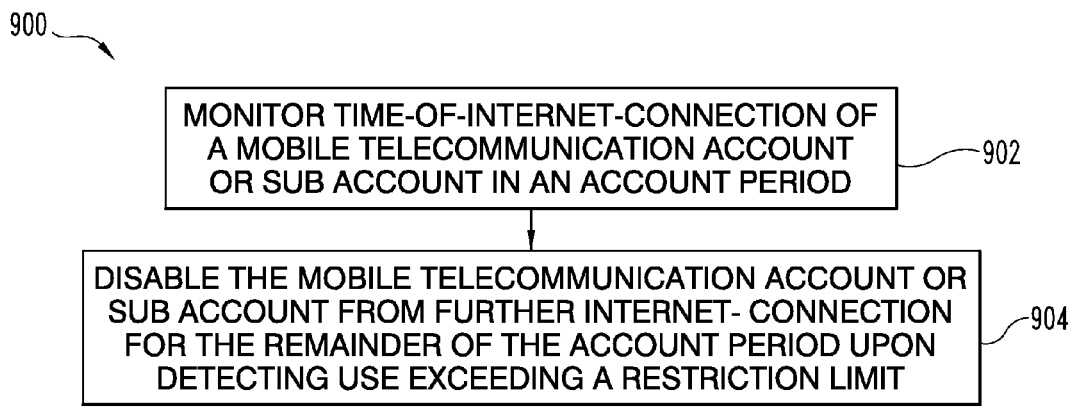
FIG. 9 illustrates a method of restricting time-of-internet-connection.

Referring to FIG. 9, an embodiment of internet connectivity restriction 514 is illustrated as method 900. Method 900 begins by monitoring the time of internet connectivity of mobile devices associated with a mobile telecommunication account or subaccount during a particular account period (902). Method 900 continues by disabling the mobile devices associated with the mobile telecommunication account or subaccount from further internet connectivity for the remainder of the particular account period upon detecting use exceeding internet connectivity restriction 514 (904).

Figure 10:
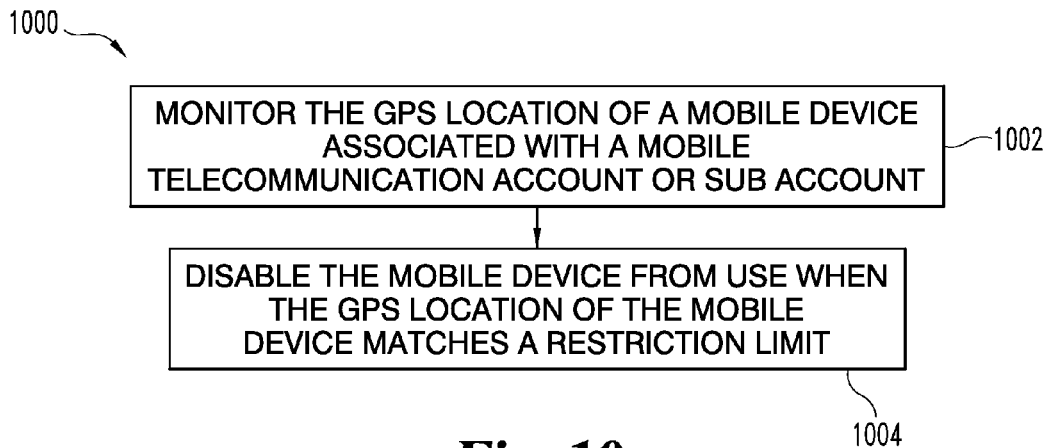
FIG. 10 illustrates a method of restricting mobile device use based on GPS location of the mobile device.

Referring to FIG. 10, an embodiment of mobile device GPS location restriction 504 is illustrated as method 1000. Method 1000 begins by monitoring the GPS location of a mobile device associated with a particular mobile telecommunication account or subaccount (1002). Method 100 continues by disabling the mobile device associated with the particular mobile telecommunication account or subaccount from use when the detected GPS location of mobile device matches mobile device GPS location restriction 504 (1004).

Figure 11:
FIG. 11 illustrates a method of restricting time of use.

Referring to FIG. 11, an embodiment of time-of-day restriction 510 and day-of-week restriction 512 is illustrated as method 1100. Method 1100 includes disabling mobile devices associated with a particular telecommunication account or subaccount from use when the current time-of-day matches times-of-day restriction 510 or the current day-of-week matches day-of-week restriction 512 (1102). These restrictions can overlap, for example, time-of-day restriction 510 can vary based on the day of the week. For example, a particular account could be permitted use 9:00 a.m. to 7:00 p.m. on Monday through Friday and excluded from use on Saturday and Sunday. In yet another example, a particular telecommunication account or subaccount could be permitted use from 3:00 to 9:00 p.m. on Monday through Friday and from 9:00 a.m. to 11:00 p.m. on Saturday.

Mobile device restrictions 500 can be applied to mobile device 120 (or the associated telephone number) and mobile telephone network 110 in a variety of ways. In one embodiment, mobile device restrictions 500 may be absolute wherein access by mobile device 120 via mobile telephone network 110 is prohibited if any mobile device restriction 500 is violated. For example, if mobile device 120 exceeds its minutes-of-use 502 restriction for a particular period, mobile device 120 may be prohibited from sending and/or receiving any further calls during the particular period. In another embodiment, mobile telephone restrictions 500 can be applied to provide a warning, for example, an SMS message sent by mobile telephone network 110 to mobile device 120 indicating a restriction has been exceeded. In yet another embodiment, restrictions 500 can include exceptions to general restrictions. For example, in the event minutes-of-use restriction 502 is exceeded calls are prohibited except for calls received from or sent to a particular telephone number. Restrictions 500 can be enforced either at mobile telephone network 110 and/or at mobile device 120.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A system for managing access to a mobile telecommunication account, the system comprising:
   a code database comprising a plurality of telephone numbers, each of which is individually associated with one of a plurality of codes, each of the plurality of telephone numbers being associated with the mobile telecommunications account;
   a mobile device, wherein the mobile device can be associated with any of the plurality of telephone numbers at different times, based on entry of an associated code into the mobile device; and
   a mobile telecommunications network configured to:
      receive, from the mobile device, a code input by a user;
      access the code database;
      compare the received code with codes in the database;
      validate the entered code;
      associate the mobile device with a particular telephone number corresponding to the entered code, wherein one or more attributes of the mobile device itself are associated with the particular telephone number;
      disassociate the particular telephone number from association with any other mobile device in response to the mobile device being associated with the particular telephone number; and
      notify, in response to associating the mobile device with the particular telephone number, a holder of the mobile telecommunications account with a status of the mobile device, wherein the status of the mobile device identifies a global positioning system location of the mobile device.

2. The system of claim 1, wherein associating the mobile phone with a particular telephone number comprises associating a mobile station identifier (MSID) with a serial number of the mobile device.

3. The system of claim 1, wherein associating the mobile phone with a particular telephone number comprises transferring customized settings to the mobile device.

4. The system of claim 3, wherein associating the mobile phone with a particular telephone number comprises transferring the customized settings from a memory of the mobile device to the mobile device.

5. The system of claim 3, further comprising a settings database in the mobile telecommunications network, wherein associating the mobile phone with a particular telephone number comprises transferring the customized settings from the settings database to the mobile device.

6. The system of claim 3, wherein the custom settings comprise contacts.

7. The system of claim 3, wherein the custom settings comprise call history, call settings, minutes of use, text usage, and data usage.

8. The system of claim 3, wherein the custom settings comprise downloads, photographs, and internet favorites.

9. The system of claim 1, further comprising a restrictions database in the mobile telecommunications network, wherein associating the mobile phone with a particular telephone number comprises implementing applying one or more restrictions from the restrictions database to the mobile device.

10. The system of claim 9, wherein the one or more restrictions are selected from the group consisting of: minutes-of-use, mobile device GPS location, number of text-messages, data use, time-of-day and day-of-week.

11. A method of managing access to a mobile telecommunication account, the system comprising:
    storing, in a code database in a mobile telecommunications network, a plurality of telephone numbers;
    associating, in the code database, each of the codes with one of a plurality of telephone numbers, each of the plurality of telephone numbers being associated with the mobile telecommunications account;
    receiving, by a computer in the mobile telecommunications network and from the mobile device, a code input by a user;
    accessing, with the computer, the code database;
    comparing, with the computer, the received code with codes in the database;
    validating, with the computer, the entered code;
    associating, in the mobile telecommunications network, the mobile device with a particular telephone number corresponding to the entered code, wherein one or more attributes of the mobile device itself are associated with the particular telephone number;
    disassociating, in the mobile telecommunications network, the particular telephone number from association with any other mobile device in response to the mobile device being associated with the particular telephone number; and
    notifying, in response to associating the mobile device with the particular telephone number, a holder of the mobile telecommunications account with a status of the mobile device, wherein the status of the mobile device identifies a global positioning system location of the mobile device.

12. The method of claim 11, wherein associating the mobile phone with a particular telephone number comprises associating a mobile station identifier (MSID) with a serial number of the mobile device.

13. The method of claim 11, wherein associating the mobile phone with a particular telephone number comprises transferring customized settings to the mobile device.

14. The method of claim 13, wherein associating the mobile phone with a particular telephone number comprises transferring the customized settings from a memory of the mobile device to the mobile device.

15. The method of claim 13, wherein associating the mobile phone with a particular telephone number comprises transferring the customized settings from a settings database in the mobile telecommunications network to the mobile device.

16. The method of claim 13, wherein the custom settings comprise contacts.

17. The method of claim 13, wherein the custom settings comprise call history, call settings, minutes of use, text usage, and data usage.

18. The method of claim 13, wherein the custom settings comprise downloads, photographs, and internet favorites.

19. The method of claim 11, wherein associating the mobile phone with a particular telephone number comprises implementing applying one or more restrictions from a restrictions database in the mobile telecommunications network to the mobile device.

20. The method of claim 19, wherein the one or more restrictions are selected from the group consisting of: minutes-of-use, mobile device GPS location, number of text-messages, data use, time-of-day and day-of-week.

* * * * *